United States Patent
Delacruz et al.

(10) Patent No.: US 10,418,214 B2
(45) Date of Patent: Sep. 17, 2019

(54) CIRCUIT AND METHOD FOR PROVIDING A CONSTANT MAGNETIC FIELD TO ACTUATE ELECTROMECHANICAL RELAYS AND CONTACTORS OVER A LARGE TEMPERATURE RANGE

(71) Applicant: TE CONNECTIVITY CORPORATION, Berwyn, PA (US)

(72) Inventors: Robert Steve Felisilda Delacruz, Columbus, OH (US); Richard R. Gorenflo, Nevada, OH (US); Richard A. Gast, Bellville, OH (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 320 days.

(21) Appl. No.: 15/581,915

(22) Filed: Apr. 28, 2017

(65) Prior Publication Data

US 2018/0315566 A1 Nov. 1, 2018

(51) Int. Cl.
*H01H 47/00* (2006.01)
*H01H 47/32* (2006.01)
(Continued)

(52) U.S. Cl.
CPC .......... *H01H 47/002* (2013.01); *H01H 47/02* (2013.01); *H01H 47/22* (2013.01);
(Continued)

(58) Field of Classification Search
CPC ...... H01H 47/002; H01H 47/02; H01H 47/22; H01H 47/26; H01H 47/32; H01H 50/44; G01K 7/24; G05F 7/00
(Continued)

(56) References Cited

U.S. PATENT DOCUMENTS 3,914,952 A * 10/1975 Barbier ................. F25B 41/043
                                                              236/75
2004/0240140 A1* 12/2004 Maller ................. F16K 31/0675
                                                              361/142

FOREIGN PATENT DOCUMENTS

CN      202 259 042 U      5/2012
DE  10 2013 219864 A1      4/2015
(Continued)

OTHER PUBLICATIONS

International Search Report, Application No. PCT/IB2018/052728, International Filing Date, Apr. 19, 2018.
(Continued)

*Primary Examiner* — Zeev V Kitov

(57) ABSTRACT

A circuit and method for controlling a voltage applied to a coil to actuate electromechanical relays or contactors. The strength of a magnetic field operating the coil is a function of the product of the number of turns of the coil wire and the magnitude of current, in amperes, passing through the coil wire. An adjustable voltage regulator provides a regulated voltage as an output to a first terminal of a coil to energize the coil based on the temperature of the coil as sensed by a temperature sensing device located proximate the coil. The regulated voltage is controlled based on the sensed coil temperature to consistently provide a current of optimal magnitude to actuate the coil at the sensed temperature. A transient voltage suppression circuit may be used with the coil to suppress back electromotive force generated currents and voltages when the coil is de-energized.

18 Claims, 2 Drawing Sheets

(51) Int. Cl.
*H01H 47/26* (2006.01)
*H01H 50/44* (2006.01)
*H01H 47/02* (2006.01)
*H01H 47/22* (2006.01)
*G01K 7/24* (2006.01)
*G05F 7/00* (2006.01)

(52) U.S. Cl.
CPC ............ *H01H 47/26* (2013.01); *H01H 47/32* (2013.01); *H01H 50/44* (2013.01); *G01K 7/24* (2013.01); *G05F 7/00* (2013.01); *H01H 2047/025* (2013.01)

(58) Field of Classification Search
USPC ........................................................ 361/165
See application file for complete search history.

(56) References Cited

FOREIGN PATENT DOCUMENTS

| JP | 2007 018927 A | 1/2007 |
|---|---|---|
| JP | 2015011836 A | 1/2015 |

OTHER PUBLICATIONS

Database WPI, XP002782305, AN 2015-14966N, Thomson Scientific, Week 201518, London, GB.
Databaes WPI. XP002782306, AN-2012-K52241, Thomson Scientific, Week 201271, London, GB.

\* cited by examiner

CIRCUIT AND METHOD FOR PROVIDING A CONSTANT MAGNETIC FIELD TO ACTUATE ELECTROMECHANICAL RELAYS AND CONTACTORS OVER A LARGE TEMPERATURE RANGE

FIELD OF THE INVENTION

The present invention is directed to electromechanical relays and contactors. The application relates more specifically to providing a constant magnetic field to the coil of an electromechanical relay or contactor over a wide temperature range to actuate the relay or contactor drive coil.

BACKGROUND OF THE INVENTION

Electromechanical relays and contactors are actuated to close contacts, open contacts, or to both close and open contacts, by one or more energized coils. Typically the coils are powered by a fixed voltage source. The strength of a magnetic field operating an electromechanical relay or contactor is a function of the product of the number of turns of the coil wire and the magnitude of the current, measured in amperes, passing through the coil wire. Coils have a fixed number of turns of coil wire, typically copper, that does not change after the coil is made. The only controllable variable in operating the coil is the magnitude of coil current. For a coil operated by a fixed direct current (DC) voltage source, the magnitude of coil current is determined by the voltage applied to the coil and the resistance of the coil. The coil resistance varies with the temperature of the coil exhibiting a positive temperature coefficient which causes the coil resistance to increase as the temperature of the coil wire increases and causes the coil resistance to decrease as the temperature of the coil wire decreases.

The coil in an electromechanical relay or contactor is typically powered by a fixed voltage source. When the temperature of the coil increases, due to heat generated when current passes through the coil during operation or due to a change in ambient temperature, the resistance of the coil increases and applications having a fixed voltage powering the coil provide less current to the coil which concomitantly results in producing a weaker magnetic field to actuate the coil of the relay or contactor. When the magnitude of current is too small, the coil may slowly actuate a relay or contactor causing an opportunity for prolonged arcing of contacts, welding of contacts, or in a worse case, the magnetic field may not be strong enough for the relay or contactor to actuate.

Conversely, when the coil temperature decreases, due to less heat being generated as a result of less frequent operation or a decrease in the ambient temperature, the resistance of the coil decreases and applications having a fixed voltage powering the coil provide more current to the cooler coil than when the coil is operated at a warmer temperature. In addition, when the magnitude of the current is too large, the relay or contactor will actuate more forcefully which can cause damage to contacts being subjected to excessive forces. The increased current can cause the undesirable condition of exceeding a power budget allocated to the system in which the electromechanical relay or contactor operates.

What is a needed is a technique to provide a constant magnitude current to produce a constant magnetic field to actuate the coil of electromechanical relays and contactors over a wide temperature range without providing a current of insufficient or excessive magnitude.

BRIEF DESCRIPTION OF THE INVENTION

In an embodiment of the invention, a method for controlling a voltage applied to a coil includes providing an adjustable voltage regulator. The voltage regulator receives power from a source when connected thereto. The voltage regulator receives a variable control voltage and provides a regulated voltage at an output. The temperature of the coil is sensed with a temperature sensing device. The regulated voltage output from the voltage regulator is coupled to a first terminal of the coil and to a first terminal of a voltage divider. The voltage divider is comprised of an impedance and the temperature sensing device. The voltage divider has a midpoint at a junction of the impedance and the temperature sensing device at which a midpoint voltage is developed. The midpoint voltage is provided as the variable control voltage to the voltage regulator. When the temperature of the coil changes, the resistance of the coil changes, the change in coil temperature is detected by the temperature sensing device, causing the voltage at the midpoint to change and in turn causes the regulated voltage at the output of the voltage regulator to modify the output voltage to provide a constant magnitude, temperature independent current to the coil upon the next actuation to assure the magnetic field will be constant for actuation without regard to the temperature of the coil.

In another embodiment of the invention, a circuit for controlling a voltage applied to a coil includes providing an adjustable voltage regulator. The voltage regulator receives power when coupled to a power source. The voltage regulator has an adjustable input and provides a regulated voltage at an output. The temperature sensing device located proximate the coil for sensing the temperature of the coil. A voltage divider circuit comprised of an impedance and the temperature sensing device is coupled between the output of the voltage regulator and a second terminal of the coil. The voltage divider circuit has a midpoint at a junction of the impedance and the temperature sensing device. A midpoint voltage is developed at the midpoint and is coupled to the variable control voltage of the voltage regulator. When the temperature of the coil changes, the resistance of the coil changes, the change in coil temperature is detected by the temperature sensing device, causing the voltage at the midpoint to change and in turn causes the regulated voltage at the output of the voltage regulator to modify the output voltage to provide a constant magnitude, temperature independent current to the coil upon the next actuation to assure the magnetic field will be constant for actuation without regard to the temperature of the coil.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numerals will be used throughout the drawings to represent the same parts.

DETAILED DESCRIPTION OF THE INVENTION

Figure 1:
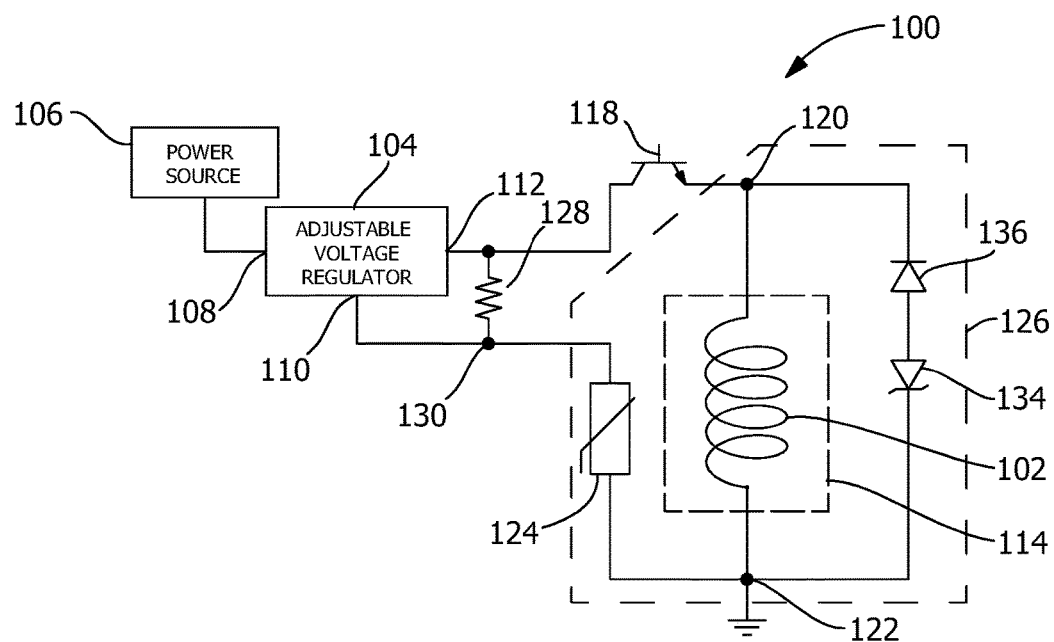
FIG. 1 is a circuit for monitoring the coil temperature of an electromechanical relay or contactor, and regulating the voltage to provide a constant current to the coil as a function of the coil temperature.

FIG. 1 is a schematic diagram illustrating a control circuit 100 for monitoring the temperature of a coil 102 of an electromagnetic relay, or an electromechanical contactor, and controlling the current provided to the coil 102 as a function of the coil temperature. Circuit 100 includes an adjustable voltage regulator 104 which is a three terminal regulator receiving power from a power source 106 at first terminal 108 and receiving an adjustable input at an adjustment input 110 for adjusting a regulated voltage provided at a third, terminal as an output. The adjustable voltage regulator may be a Linear Technology LT1083 adjustable regulator, but is not limited thereto. The regulated voltage provided at an output 112 is applied to coil 102 to actuate a relay 114 (FIG. 2) or contactor 116 (FIG. 3). A switch, such as but not limited to transistor 118, is switched to an on state to couple the regulated voltage provided at the output 112 to first coil terminal 120 to actuate the relay or contactor and may be turned off otherwise. In the embodiment illustrated in FIG. 1, the second coil terminal 122 is coupled to a ground. In other embodiments, a switch, such as but not limited to transistor 118, could be located at other selected locations including, but not limited to, between the second coil terminal 122 and ground, or to disconnect power source 106 such as between power source 106 and first terminal 108 of adjustable voltage regulator 104.

In some embodiments, a thermistor 124 is used to sense the temperature of coil 102. A thermistor is a resistor that changes resistance in response to a change in the temperature of the thermistor. To sense the temperature of the coil, thermistor 124 is placed where changes in the temperature of the coil 102 impact the temperature sensed by thermistor 124. Thermistor 124 is placed in contact with the coil 102 or adjacent to coil 102. In applications where relay 114 or contactor 116 are enclosed in a housing 126, sensing the ambient temperature within the housing 126 may suffice.

Thermistor 124, or other temperature sensing devices including but not limited to thermocouples and resistance temperature detectors (RTD), is selected to provide a linear temperature change over the temperature range to which the application will be subjected. Since the resistance of a coil varies with temperature, the DC resistance of relay and contactor coils is specified at ostensibly "room temperature," 20° C. Coil 102 is typically made of copper wire. The resistance of copper wire has a positive temperature coefficient such that coil resistance increases as the temperature of the coil wire increases, and the coil resistance decreases as the temperature of the wire in the coil decreases. A thermistor 124, or other temperature sensing device having a positive temperature coefficient, is readily used to sense the temperature of a coil, or a change of the temperature of a coil. A positive temperature coefficient means an increase in temperature of the coil causes an increase in coil resistance and a decrease in temperature of the coil causes a decrease in coil resistance. For a coil made of copper wire, the increase and decrease are proportional linear changes as can be seen with reference to FIG. 2. Some thermistors and other temperature sensing devices have a negative temperature coefficient. A thermistor or other temperature sensing device having a negative temperature coefficient can be used to sense a temperature change of the coil. A negative temperature coefficient temperature sensing device means an increase in the temperature of the coil causes a decrease in the magnitude of the coil temperature sensing device output and a decrease in the temperature of the coil causes an increase in the magnitude of the coil temperature sensing device output.

Figure 2:
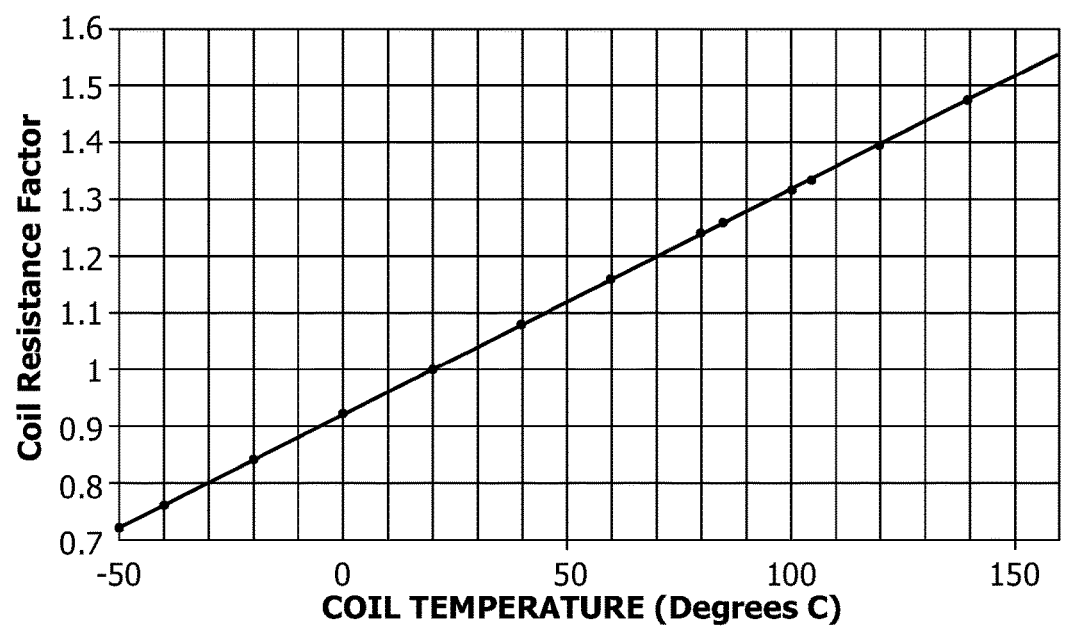
FIG. 2 is a graphical representation of the positive temperature coefficient of a copper wire coil.
Figure 3:
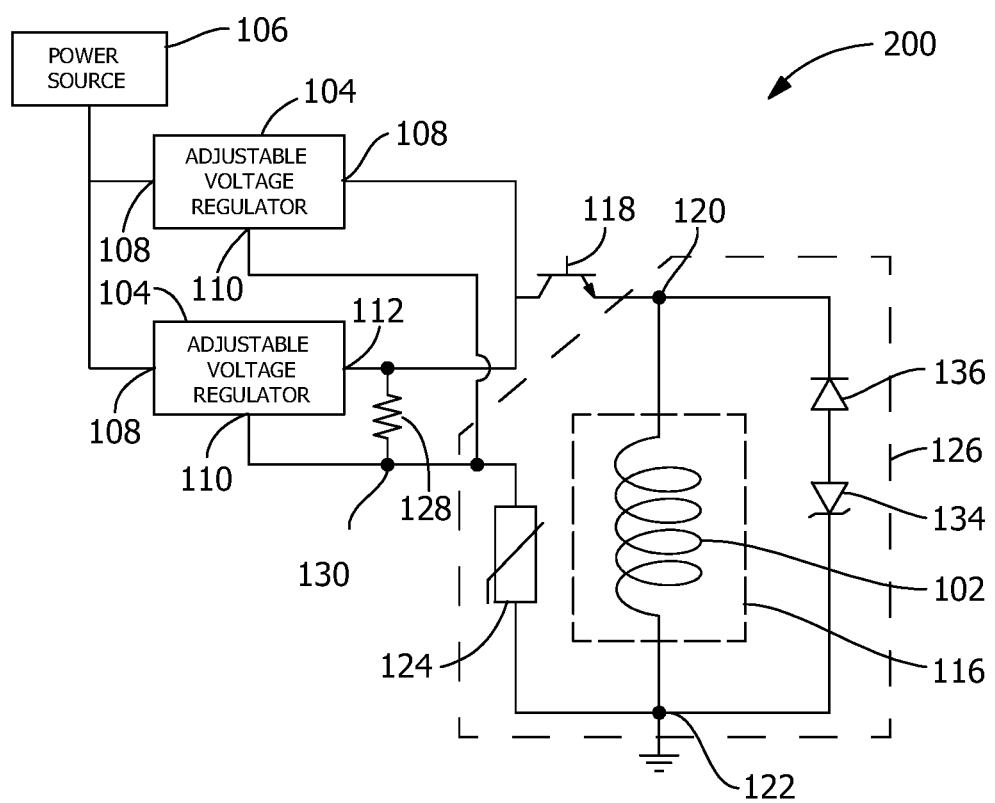
FIG. 3 is a circuit illustrating electromagnetic relays or contactors that require more current than can be supplied by a single adjustable voltage regulator can be provided sufficient current by operating multiple adjustable voltage regulators in parallel.

FIG. 2 graphically illustrates a positive temperature coefficient for a copper wire coil. The graph provides a coil resistance factor versus coil temperature based on the coil resistance factor being 1 at 20 degrees Celsius.

Thermistor 124 forms a voltage divider with resistor 128, defining a midpoint 130 having a midpoint voltage 132. Resistor 128, which in some embodiments is 240 ohms, is coupled between the regulated voltage output 112 and midpoint 130. Thermistor 124 is coupled between the midpoint 130 and the second coil terminal 122. The midpoint 130 is coupled to the adjustment input 110.

In operation, when the temperature of the coil 102 changes, a different voltage magnitude is needed to generate the same magnitude of current through the coil 102 to maintain the number of amp-turns appropriate to provide a magnetic field strength sufficient to actuate the coil 102 without under-driving or overdriving actuation of the relay 114 or contactor 116. A higher voltage is applied to the coil 102 when the coil temperature and resistance are elevated, and a lower voltage is applied to the coil 102 when the coil temperature and resistance are lower. The current and power requirements are predictable over the temperature range of operational interest and can be allocated for a power budget. Knowing the current and power requirements a power budget can be defined that prevents coil current draw from exceeding the current budget.

For example, for a coil 102 with wire having a positive temperature coefficient, when the temperature of the coil 102 increases, the resistance of the coil 102 also increases. The coil temperature increase is sensed by the thermistor 124 causing the resistance of thermistor 124 to increase. The voltage at midpoint 130 increases which increases the input to the adjustment input 110. In turn, the voltage regulator 104 increases the regulated voltage provided to the output 112 to compensate for the increase in resistance of the coil 102 to provide a constant current magnitude to actuate the coil 102 in response to the increase in the magnitude of coil resistance.

Conversely, for a coil with a positive temperature coefficient, when the temperature of the coil 102 decreases, the resistance of the coil 102 also decreases. The coil temperature decrease is sensed by the thermistor 124 causing the resistance of thermistor 124 to decrease. The voltage at midpoint 130 decreases which decreases the input to the adjustment input 110. In turn, the voltage regulator 104 decreases the regulated voltage provided to the output 112 to compensate for the decrease in resistance of the coil 102 to provide a constant current magnitude to actuate the coil 102 in response to the decrease in the magnitude of coil resistance.

FIG. 3 is a control circuit 200 illustrating adjustable voltage regulators 104 can be operated in parallel to provide an adequate magnitude of current to relays 114 or contactors 116 that require more current than can be supplied by a single adjustable voltage regulator 104. While two adjustable voltage regulators 104 are illustrated operating in parallel, at least two voltage regulators 104, or two or more voltage regulators 104 can be operated in parallel to supply the magnitude of current needed.

Some embodiments of low power systems in which control circuit 100 or 200 are installed may be capable of withstanding the back electromotive force generated when transistor 118 is turned off to de-energize coil 102 by a cessation of current through coil 102. Such systems do not require transient voltage suppression. Embodiments of other systems are less tolerant of the back electromotive force and will require voltage suppression.

A transient voltage generated by coil 102 when current to the coil 102 is interrupted such as to de-energize coil 102, can be suppressed by a transient voltage suppression circuit in parallel with coil 102. An embodiment of a suppression circuit including Zener diode 134 and diode 136 is illustrated in FIGS. 1 and 3. Zener diode 134 provides transient voltage suppression subsequent to transistor 118 transitioning from an on, conducting state to an off, non-conducting state. Diode 136, which prevents current from bypassing coil 102 while transistor 118 is in the on state, passes current generated by the back electromotive force. The current generated by the back electromotive force passes through the Zener diode 134 and diode 136 and circulates back through coil as energy is dissipated as heat and the transient voltage is suppressed. Zener diode 134 will conduct current up to the voltage limit for which the diode is designed to breakdown, not allowing the voltage to exceed the breakdown voltage. Transient voltage suppression circuits are not limited to the disclosed embodiment. For example, silicon avalanche diodes can be used instead of a Zener diode, and bidirectional Zener diodes can be used with appropriate circuitry.

While embodiments of the invention have been described with respect to a thermistor having a positive temperature coefficient, one skilled in the art could design a circuit to achieve the same function using a thermistor having a negative temperature coefficient.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

The invention claimed is:

1. A method for controlling a voltage applied to a coil, comprising the steps of:
    providing an adjustable voltage regulator, the voltage regulator receiving power from a source when connected thereto, the voltage regulator receiving a variable control voltage and providing a regulated voltage at an output;
    sensing a temperature of the coil with a temperature sensing device;
    coupling the regulated voltage output from the voltage regulator to a first terminal of the coil and to a first terminal of a voltage divider, the voltage divider comprised of an impedance and the temperature sensing device, the voltage divider having a midpoint at a junction of the impedance and the temperature sensing device at which a midpoint voltage is developed; and
    providing the midpoint voltage as the variable control voltage input to the voltage regulator;
    wherein, when the temperature of the coil changes, the resistance of the coil changes, the change in coil temperature is detected by the temperature sensing device, causing the voltage at the midpoint to change, causing the variable control voltage to change, and in turn, causing the regulated voltage at the output of the voltage regulator to change to provide a constant magnitude, temperature independent current to the coil upon the next coil actuation to assure the magnetic field will be constant for actuation without regard to the temperature of the coil.

2. The method of claim 1, wherein the temperature sensing device is a thermistor.

3. The method of claim 2, wherein the resistance value of the thermistor changes linearly with temperature.

4. The method of claim 3, wherein a temperature coefficient of the thermistor resistance is selected from the group consisting of a positive temperature coefficient and a negative temperature coefficient.

5. The method of claim 1, wherein the coil comprises copper wire.

6. The method of claim 1, wherein the coil is part of an electromechanical device selected from the group consisting of a relay and a contactor.

7. The method of claim 1, wherein the adjustable voltage regulator comprises at least two adjustable voltage regulators operating in parallel.

8. The method of claim 1, further comprising a transient voltage suppression circuit to dissipate energy stored in the coil when the coil is de-energized.

9. The method of claim 8, wherein the transient voltage suppression circuit includes a transient voltage suppression device selected from the group consisting of a silicon avalanche diode or a Zener diode.

10. A circuit for controlling a voltage applied to a coil, comprising:
    an adjustable voltage regulator, the voltage regulator receiving an input voltage when coupled to a voltage source, and an adjustable input, the voltage regulator providing a regulated voltage at an output to a first terminal of the coil;
    a temperature sensing device located proximate the coil for sensing a temperature of the coil;
    a voltage divider circuit comprising an impedance and the temperature sensing device, the voltage divider circuit coupled between the output of the voltage regulator and a second terminal of the coil, the voltage divider circuit having a midpoint at a junction of the impedance and the temperature sensing devices at which a midpoint voltage is developed, the midpoint coupled to the adjustable input of the voltage regulator,
    wherein when the temperature of the coil changes, resistance of the coil changes, the midpoint voltage changes causing the voltage regulator to modify the regulated voltage at the output applied to the first terminal of the coil to compensate for the change in resistance of the coil and to provide a constant magnitude, temperature independent current to actuate the coil.

11. The circuit of claim 10, wherein the temperature sensing device is a thermistor.

12. The circuit of claim 11, wherein the resistance value of the thermistor changes linearly with temperature.

13. The circuit of claim 12 wherein a temperature coefficient of the thermistor is selected from the group consisting of a positive temperature coefficient and a negative temperature coefficient.

14. The circuit of claim 10, wherein the coil comprises copper wire.

15. The method of claim 10, wherein the coil is part of an electromechanical device selected from the group consisting of a relay and a contactor.

16. The circuit of claim 10, wherein the adjustable voltage regulator further comprises at least two adjustable voltage regulators operating in parallel.

17. The circuit of claim 10, further comprising a transient voltage suppression circuit to dissipate energy stored in the coil when the coil is de-energized.

18. The circuit of claim 17, wherein the transient voltage suppression circuit includes a transient voltage suppression device selected from the group consisting of a silicon avalanche diode and a Zener diode.

\* \* \* \* \*